(12) United States Patent
Natter et al.

(10) Patent No.: US 9,793,642 B2
(45) Date of Patent: Oct. 17, 2017

(54) CONNECTOR ASSEMBLY

(75) Inventors: Brantley Natter, Brighton, MI (US);
Randall Riddle, Troy, MI (US); Keith R. Kwasny, Northville, MI (US); Marc Poulin, Chesterfield, MI (US); Juan Lopez, Madison Heights, MI (US)

(73) Assignee: Lear Corporation, Southfield, MI (US)

(*) Notice: Subject to any disclaimer, the term of this patent is extended or adjusted under 35 U.S.C. 154(b) by 835 days.

(21) Appl. No.: 13/570,484

(22) Filed: Aug. 9, 2012

(65) Prior Publication Data

US 2013/0052853 A1    Feb. 28, 2013

Related U.S. Application Data

(60) Provisional application No. 61/526,073, filed on Aug. 22, 2011.

(51) Int. Cl.
*H01R 13/506* (2006.01)
*B60L 11/18* (2006.01)
*H01R 13/633* (2006.01)

(52) U.S. Cl.
CPC ........ *H01R 13/506* (2013.01); *B60L 11/1818* (2013.01); *B60L 11/1825* (2013.01); *B60L 2230/12* (2013.01); *B60L 2270/40* (2013.01); *H01R 13/6335* (2013.01); *Y02T 10/7005* (2013.01); *Y02T 10/7088* (2013.01);
(Continued)

(58) Field of Classification Search
CPC .............. H01R 13/506; H01R 13/6335; B60L 11/1818; B60L 11/1825; B60L 2230/12
USPC .................................. 439/345, 660, 891, 680
See application file for complete search history.

(56) References Cited

U.S. PATENT DOCUMENTS

| 3,634,806 A | 1/1972 | Fergusson |
| 3,816,641 A | 6/1974 | Iversen |
| 4,053,201 A | 10/1977 | Grappe |

(Continued)

FOREIGN PATENT DOCUMENTS

| CN | 1213871 A | 4/1999 |
| CN | 101188319 A | 5/2008 |

(Continued)

OTHER PUBLICATIONS

Chinese Office Action for corresponding Application No. 201210300808.2, mailed Mar. 19, 2015, 6 pages.
(Continued)

*Primary Examiner* — Alexander Gilman
(74) *Attorney, Agent, or Firm* — Brooks Kushman P.C.

(57) ABSTRACT

A connector assembly is provided with a housing forming an exterior, an inlet end, a cavity, and an outlet end. The housing has a recess formed within the exterior and at least one aperture formed through the housing within the recess for venting the cavity. A cord extends through the inlet end into the cavity. The first housing portion has a first fastener mechanism formed within the cavity. The second housing portion is provided with a second fastener mechanism sized to extend into the first housing portion cavity for engagement with the first fastener mechanism to fasten the first housing portion and the second housing portion together. A molded material is disposed within the cavity for engaging the fastened first and second fastener mechanisms for minimizing unfastening of the first and second fastener mechanisms. Retainers are provided for cords of varying thicknesses.

20 Claims, 6 Drawing Sheets

(52) U.S. Cl.
CPC ............ *Y02T 90/121* (2013.01); *Y02T 90/128* (2013.01); *Y02T 90/14* (2013.01)

(56) References Cited

U.S. PATENT DOCUMENTS

| | | | |
|---|---|---|---|
| 4,583,804 A * | 4/1986 | Thompson | 439/588 |
| 4,679,875 A * | 7/1987 | Ramsey | 439/604 |
| 5,350,312 A | 9/1994 | Kuno et al. | |
| 5,470,248 A | 11/1995 | Wood | |
| 5,513,075 A * | 4/1996 | Capper et al. | 361/773 |
| 5,535,274 A | 7/1996 | Braitberg et al. | |
| 5,567,170 A * | 10/1996 | Kroeber | 439/186 |
| D375,721 S | 11/1996 | Endo et al. | |
| 5,575,675 A | 11/1996 | Endo et al. | |
| 5,588,852 A | 12/1996 | Puerner | |
| D379,967 S | 6/1997 | Hashizawa et al. | |
| 5,639,256 A | 6/1997 | Endo et al. | |
| D390,827 S | 2/1998 | Sekimori et al. | |
| 5,751,135 A | 5/1998 | Fukushima et al. | |
| 5,873,737 A | 2/1999 | Hashizawa et al. | |
| 6,123,569 A * | 9/2000 | Fukushima et al. | 439/456 |
| 6,231,392 B1 | 5/2001 | van Woensel | |
| 6,602,090 B2 * | 8/2003 | Kato | 439/455 |
| 7,530,826 B2 * | 5/2009 | Zeigler | 439/206 |
| 7,789,689 B2 * | 9/2010 | Frey et al. | 439/275 |
| 7,837,658 B2 * | 11/2010 | Cote et al. | 604/236 |
| 7,878,866 B1 * | 2/2011 | Kwasny et al. | 439/695 |
| D636,334 S * | 4/2011 | Kato et al. | D13/119 |
| 8,016,607 B2 * | 9/2011 | Brown, II | 439/353 |
| 8,052,468 B2 | 11/2011 | Crooijmans et al. | |
| D655,242 S | 3/2012 | Holthusen | |
| 8,152,550 B2 * | 4/2012 | Ichio et al. | 439/304 |
| 8,206,171 B2 * | 6/2012 | Osawa et al. | 439/352 |
| D663,692 S | 7/2012 | Sebald et al. | |
| D666,152 S | 8/2012 | Riddle et al. | |
| D667,378 S | 9/2012 | Yamamoto | |
| D669,033 S * | 10/2012 | Senk et al. | D13/146 |
| 8,342,856 B2 * | 1/2013 | Takada et al. | 439/34 |
| D677,632 S | 3/2013 | Riddle et al. | |
| 8,506,315 B2 | 8/2013 | Canedo et al. | |
| 8,573,998 B2 * | 11/2013 | Ichio | 439/358 |
| 8,586,879 B2 * | 11/2013 | Schadow et al. | 174/650 |
| D700,143 S * | 2/2014 | Ichio et al. | D13/146 |
| 2008/0045058 A1 * | 2/2008 | Stepniak et al. | 439/187 |
| 2008/0070433 A1 * | 3/2008 | Zeigler | 439/206 |
| 2010/0144191 A1 | 6/2010 | Machado et al. | |
| 2011/0034053 A1 | 2/2011 | Matsumoto et al. | |
| 2011/0070758 A1 * | 3/2011 | Poulin et al. | 439/153 |
| 2011/0097920 A1 | 4/2011 | Amit et al. | |
| 2011/0145141 A1 | 6/2011 | Blain | |
| 2011/0212645 A1 * | 9/2011 | Osawa et al. | 439/352 |

FOREIGN PATENT DOCUMENTS

| | | |
|---|---|---|
| CN | 101425640 A | 5/2009 |
| CN | 101740947 A | 6/2010 |
| CN | 102017320 A | 4/2011 |
| DE | 19509336 A1 | 9/1995 |
| DE | 19605206 A1 | 8/1996 |
| DE | 19943373 A1 | 3/2000 |
| DE | 102004002403 B3 | 7/2005 |
| JP | 2010182461 A | 8/2010 |

OTHER PUBLICATIONS

Chinese Office Action for corresponding Application No. 201210300808.2, mailed Jul. 3, 2014, 10 pages.
U.S. Appl. No. 13/461,626, entitled "Connector Assembly for Vehicle Charging", filed May 1, 2012, 22 pages.
German Office Action for corresponding Application No. 10 2012 214 685.7, mailed May 12, 2016, 5 pages.

* cited by examiner

CONNECTOR ASSEMBLY

CROSS-REFERENCE TO RELATED APPLICATIONS

This application claims the benefit of U.S. provisional Application No. 61/526,073 filed Aug. 22, 2011, the disclosure of which is incorporated in its entirety by reference herein.

TECHNICAL FIELD

Various embodiments relate to connector assemblies and housings for connector assemblies.

BACKGROUND

One example of an electrical connector for vehicle charging is disclosed in U.S. Pat. No. 7,878,866 B1 to Kwasny et al.

SUMMARY

According to at least one embodiment, a connector assembly is provided with a housing forming an exterior, an inlet end, a cavity, and an outlet end. The housing has a recess formed within the exterior and at least one aperture formed through the housing within the recess for venting the cavity. A cord extends through the inlet end into the cavity.

According to at least another embodiment, a connector assembly is provided with a first housing portion forming an exterior, an inlet end, a cavity, and an outlet end. The first housing portion has a first fastener mechanism formed within the cavity. A second housing portion is sized to be assembled to the first housing portion. The second housing portion is formed with an exterior, an inlet end, a cavity, and an outlet end, each corresponding to the first housing portion. The second housing portion is provided with a second fastener mechanism sized to extend into the first housing portion cavity for engagement with the first fastener mechanism to fasten the first housing portion and the second housing portion together. A cord extends through the inlet ends of the first and second housing portions. A molded material is disposed within the cavity for engaging the fastened first and second fastener mechanisms for minimizing unfastening of the first and second fastener mechanisms.

According to at least another embodiment, a connector housing assembly is provided with a first housing portion forming an inlet end and a cavity. A first retainer is oriented within the first housing portion cavity adjacent to the inlet end. A second retainer is oriented within the first housing portion cavity spaced apart from the inlet end and the first retainer. A second housing portion is sized to be assembled to the first housing portion. The second housing portion is formed with an inlet end and a cavity, each corresponding to the first housing portion. A third retainer is oriented within the second housing portion cavity adjacent to the inlet end, opposing the first retainer and spaced apart from the first retainer a first distance for engaging a cord of a first thickness. A fourth retainer is oriented within the second housing portion cavity spaced apart from the inlet end and the third retainer, opposing the second retainer and spaced apart from the second retainer a second distance that is different than the first distance for engaging a cord of a second thickness.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It may be necessary for any number of different enclosures to be provided within a charge handle such that each wire passing through the charge handle is centered based on the wire size thereof. One or more embodiments of the present disclosure provide, among other things, a plurality of unique enclosures positioned within the charge handle. The unique enclosures may each support a wire based on its corresponding size (e.g., gauge). The unique enclosure may enable, but not limited to, for multiple wire strain relief, venting for enclosure fill (crush prevention), interior enclosure snaps. By combining the unique enclosures and exterior shell (of the charge handle) into a single charge handle, such a condition may reduce cost and weight. Each enclosure may include any number of ribs that may serve as an interior wire centering feature for each wire in the charge handle. The centering feature may improve strength and reliability of wire strain relief. The embodiments disclosed herein may meet evolving industry requirements such as, but not limited to, International Electrotechnical Commission (IEC) handle safety requirements such as drive over and wire strain relief.

Figure 1:
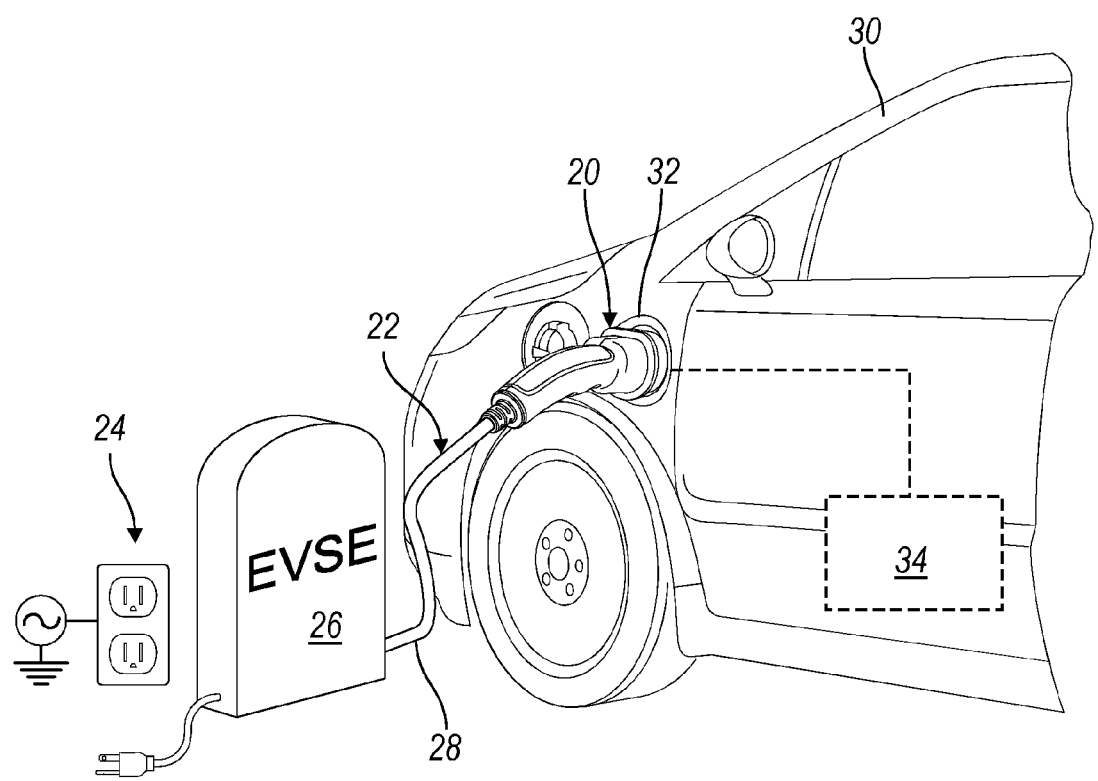
FIG. 1 is a perspective view of a connector assembly according to an embodiment illustrated in cooperation with a vehicle and a power supply.

With reference to FIG. 1, a connector assembly for facilitating electric charging of a vehicle is illustrated in accordance with an embodiment and is referenced generally by numeral 20. In general, the connector assembly 20 is configured to accommodate a number of different electrical harness configurations by interchanging a couple components.

The connector assembly 20 is included in a cordset assembly 22, according to one or more embodiments. The cordset assembly 22 includes a connector for connecting to an external power supply 24 for receiving electrical energy. The external power supply 24 represents an alternating current (AC) electrical power supply, such as a standard residential power circuit. The cord set assembly 22 includes electric vehicle supply equipment (EVSE) 26 and a charging cable 28. The charging cable 28 extends between the EVSE 26 and the connector assembly 20. The EVSE 26 is configured to monitor electrical energy passing through the cable 28 during charging. The court set assembly 22 may be configured to be portable (as shown in FIG. 1) or fixed to a charging station (not shown).

The connector assembly 20 attaches to a "plug-in" vehicle 30, such as a hybrid electric vehicle, for supplying electrical energy to the vehicle 30. The vehicle 30 includes a vehicle charging receptacle 32 that is connected to a battery 34 for receiving and storing electrical energy. The vehicle charging receptacle 32 is mounted to be externally accessible from the vehicle 30. The vehicle receptacle 32 receives the connector assembly 20. The battery 34 is electrically connected to the charging receptacle 32 for storing electrical power. The vehicle 30 may also include a converter (not shown) for converting AC to DC electrical power for storage in the battery 34. The vehicle 30 may be an electric vehicle, or any suitable vehicle that receives external electric power.

Figure 2:
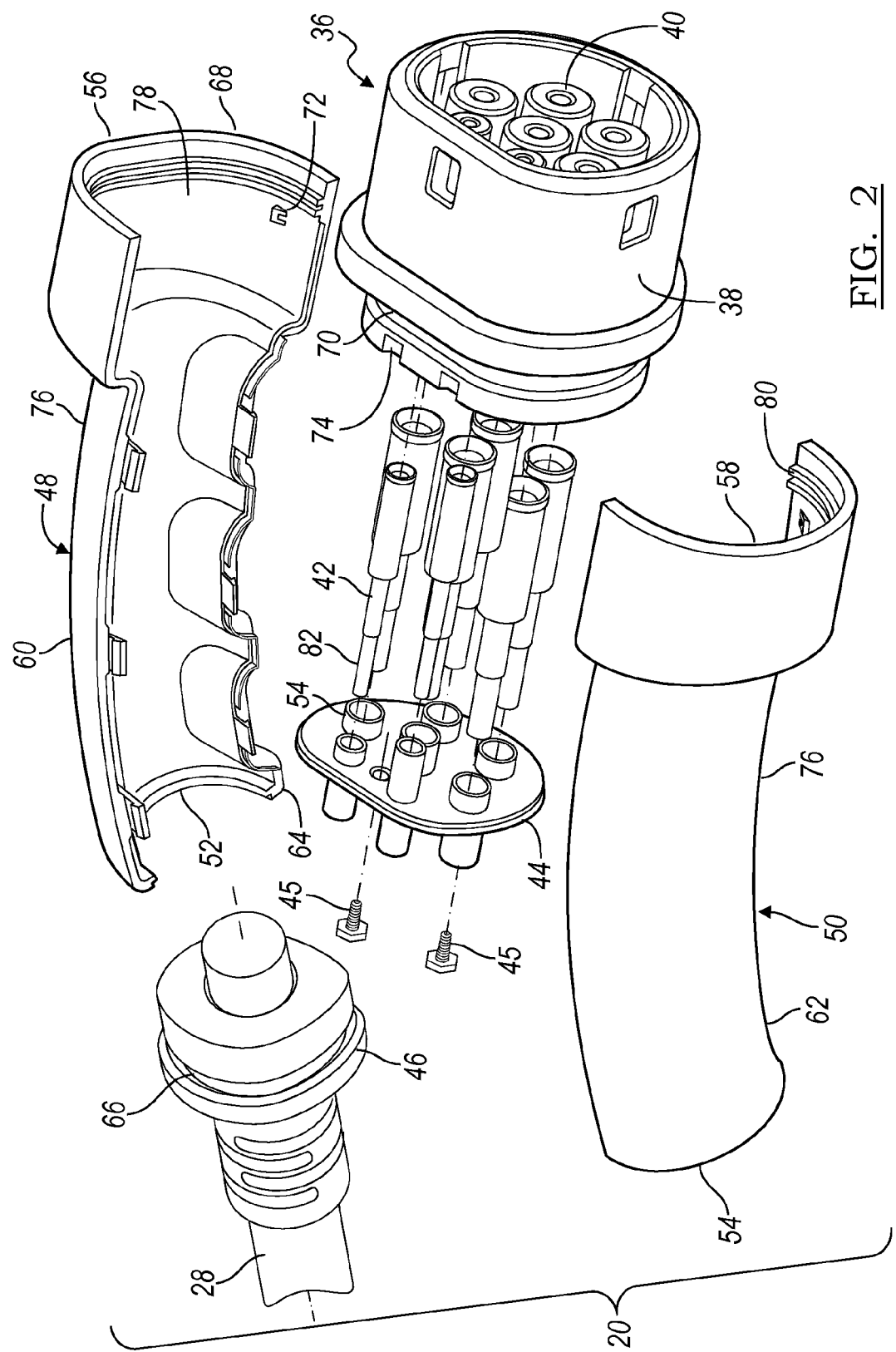
FIG. 2 is an exploded perspective view of the connector assembly of FIG. 1.

Referring now to FIG. 2, the connector assembly 20 is illustrated exploded for revealing the various components. The connector assembly 20 includes a receptacle housing portion 36 that has an external plug 38 that is sized to be received within the vehicle charging receptacle 32. The receptacle housing portion 36 includes a plurality of recessed sockets 40 that are each sized to receive an electrical connector, such as a receptacle 42. The receptacles 42 are female electrical connectors that are inserted into the sockets 40 and retained into the sockets 40 by a backing plate 44 that is fastened to the receptacle housing portion 36 by fasteners 45.

The receptacles 42 receive a plurality of pins (not shown) that are recessed within the vehicle charging receptacle 32 as is known in the art. By inserting the plug 38 into the vehicle charging receptacle 32, the receptacles 42 are aligned with the pins and the pins are received within the sockets 40 and consequently the receptacles 42 making electrical connection between the cordset assembly 22 and the vehicle 30. Although female receptacles 42 are illustrated and described, the invention contemplates any conductive connectors for the connector assembly 20. Alternatively, the sockets 40 may retain male pin connectors.

The connector assembly 20 also includes a grommet 46 upon the charging cable or cord 28 within the grommet 46. The grommet 46 provides a strain relief upon the cable 28 and prevents the connection of the cable 28 to the receptacles 42 from distributing forces that may affect, or disconnect, the connection.

The connector assembly 20 includes a first handle housing portion 48 and a second handle housing portion 50. The handle housing portions 48, 50 each include an inlet end 52, 54 and an outlet end 56, 58, with a handle region 60, 62 extending between the inlet ends 52, 54 and the outlet ends 56, 58. The first handle housing portion 48 and the second handle housing portion 50 are similar, yet mirror images of each other, for assembly in a clamshell configuration.

The inlet ends 56, 58 of the handle housing portions 48, 50 each have an inward extending retainer 64 for engaging a recess 66 in the grommet 46 for retaining the grommet and the cable 28 within the inlet ends 52, 54 of the handle housing portions 48, 50. The handle housing portions 48, 50 each have a retainer 68 adjacent the outlet ends 56, 58 for receipt within a recess 70 in the receptacle housing portion 36. Additionally, a plurality of alignment projections 72 may be provided within the outlet ends 56, 58 of the handle housing portions 48, 50 for receipt within notches 74 in the receptacle housing portion 36 for maintaining alignment of the receptacle housing portion 36 relative to the handle housing portions 48, 50.

The first handle housing portion 48 and the second handle housing portion 50 are assembled together for retaining the grommet 46 in the cable 28 at the inlet ends 52, 54; and for retaining the receptacle housing portion 36 at the outlet ends 56, 58. Once assembled, the handle region 60, 62 collectively provide a handle for manual manipulation of the connector assembly 20. The handle housing portions 48, 50 collectively provide an exterior 76 for the connector assembly 20, and each include a cavity 78, 80. Wires 82 extend from the cable 28 within the cavity 78, 80, through apertures 84; and are connected to the receptacles 42.

Figure 3:
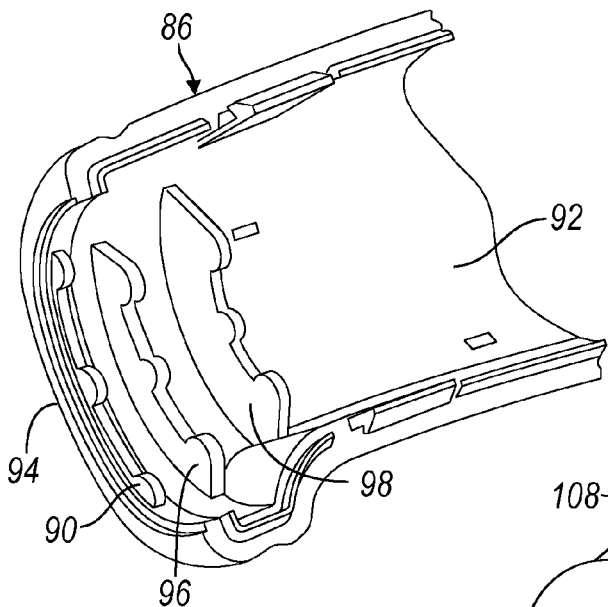
FIG. 3 is an enlarged, partially disassembled view of a portion of the connector assembly of FIG. 1, according to another embodiment.
Figure 4:
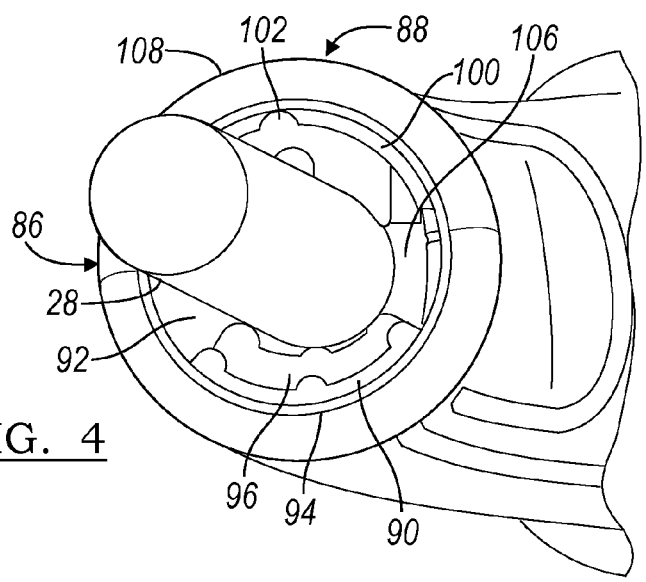
FIG. 4 is an enlarged, partially disassembled end view of the connector assembly of FIG. 1.
Figure 5:
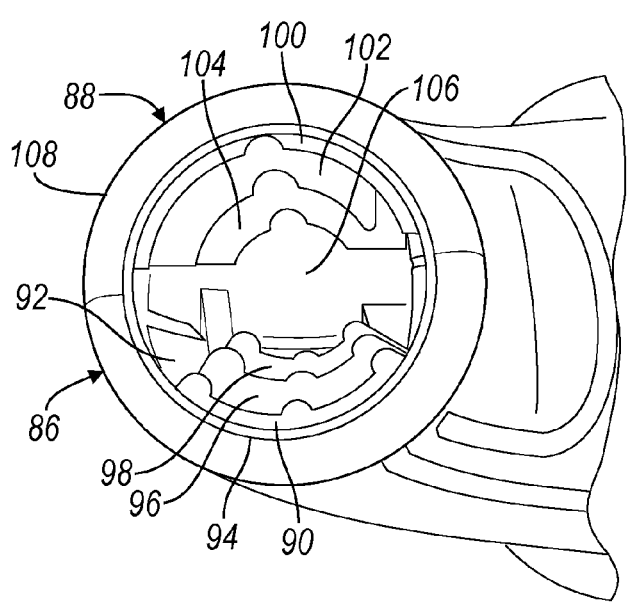
FIG. 5 is another enlarged, partially disassemble end view of the connector assembly of FIG. 1.

Referring now to FIG. 3, a first handle housing portion 86 for the connector assembly 20 is illustrated according to another embodiment. In FIG. 4, the first handle housing portion 86 is illustrated with a second handle housing portion 88 and the charging cable 28. The grommet 46 is removed from FIG. 4 for illustrating the cooperation of the housing portions 86, 88 with the cable 28. FIG. 5 illustrates the housing portions 86, 88 without the cable 28. The first housing portion 86 includes a first retainer 90 within a cavity 92 of the housing portion 86 adjacent to an inlet end 94. A second retainer 96 is spaced away from the first retainer 90 and the inlet end 94. A third retainer 98 is also provided within the cavity 92 spaced apart from the first and second retainer's 90, 96. The retainers 90, 96, 98 each extend into the cavity 92 a differing depth that sequentially increases away from the inlet end 94.

FIGS. 4 and 5 illustrate that three corresponding retainers 100, 102, 104 are provided in a cavity 106 of the second handle housing portion 88, beginning adjacent to an inlet end 108. The retainers 100, 102, 104 are each spaced apart from and opposing the retainers 90, 96, 98 of the first housing portion 86. Each pair of opposed retainers 90, 100; 96, 102; 98, 104 are spaced apart an incremental distance for engaging and retaining charging cables of varying thicknesses. For the depicted embodiment, the retainers 90, 96, 98, 100, 102, 104 are incrementally spaced for cables of varying diameters. Of course, any cable geometry is contemplated.

The retainers 90, 96, 98, 100, 102, 104 permit one pair of handle housing portions 86, 88 to accommodate charging cables of varying diameters such as the charging cable 28 are illustrated in FIG. 4, and a diameter larger than the charging cable 28, and a diameter smaller than the charging cable 28. The retainers 96, 102 engage the charging cable 28 for providing strain relief to the individual wires 82 within the charging cable 28. Likewise, varying sized grommets, such as the grommet 46 are employed for sealing the inlet ends 94, 108 and providing a flexible connection of the charging cable 28 at the inlet ends 94, 108. Alternatively, the grommet 46 may be formed from a molded material inserted into the housing portions 86, 88.

Figure 6:
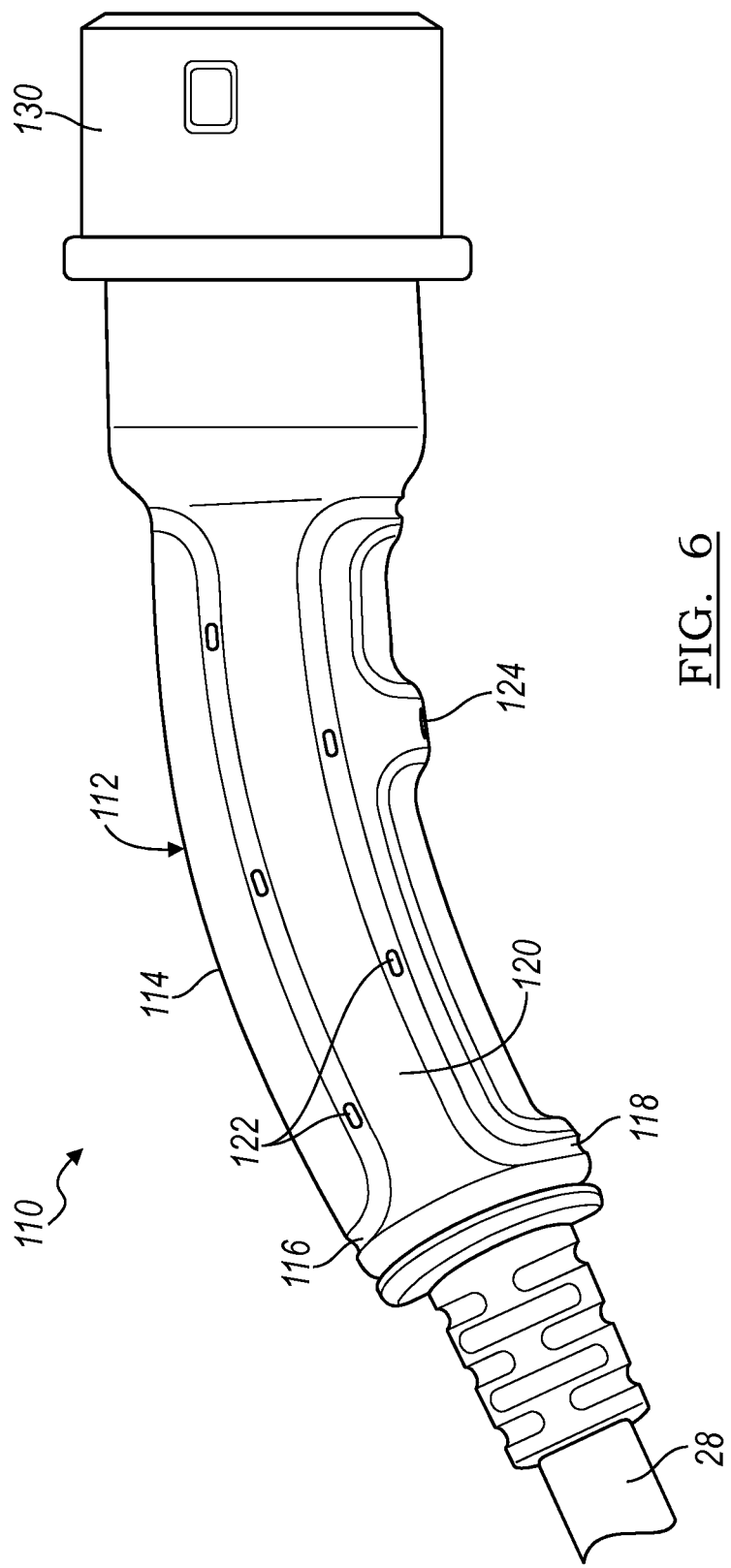
FIG. 6 is a side elevation view of the connector assembly of FIG. 1 according to an embodiment.

Referring now to FIG. 6, a connector assembly 110 is illustrated according to another embodiment. The connector assembly 110 includes a housing 112, which may be formed from a plurality of housing portions as described in the prior embodiments. The housing 112 has a handle region 114, which is illustrated with a pair of recesses 116, 118 formed into an exterior 120 of the handle region 114. The recesses 116, 118 are configured aesthetically to provide a racetrack appearance. A plurality of apertures 122 is formed within the recesses 116, 118 through the housing 112 to vent a cavity within the housing 112 to the exterior 120.

The portion of the cable 28 located within the housing 112 is encapsulated by a molded material which is formed by a low-pressure molding process. In one embodiment, the molded material includes Macromelt® material by chemical Corporation of Madison Heights, Mich. The molded material insulates and seals the cable 28 and the wires 82. The molded material assists in retaining and resisting inadvertent disassembly of components within the housing 112. An aperture 124 may be formed through the housing 112 as a gate location for inserting the molded material into the cavity of the housing 112. The apertures 122 provide vents for exhausting air as the molded material is injected into the housing 112.

The molded material may be added in a two-step process. For example, the cable 28, wires 82, and backing plate 44 may be molded in a first mold to encapsulate the cable 28 and wires 82 and to ensure that the cable 28 and wires 82 are centrally located relative to the molded material. Receipt of the backing plate 44 into a mold may assist in controlling the molded material to minimize contamination of the receptacles 42. The flow of the molded material may be more consistently controlled within a separate mold than within the housing 112. Subsequently, the premolded cable 28, wires 82, and backing plate 44 are assembled into the housing 112; and a second molding operation is conducted in the housing 112 to complete encapsulation.

Figure 7:
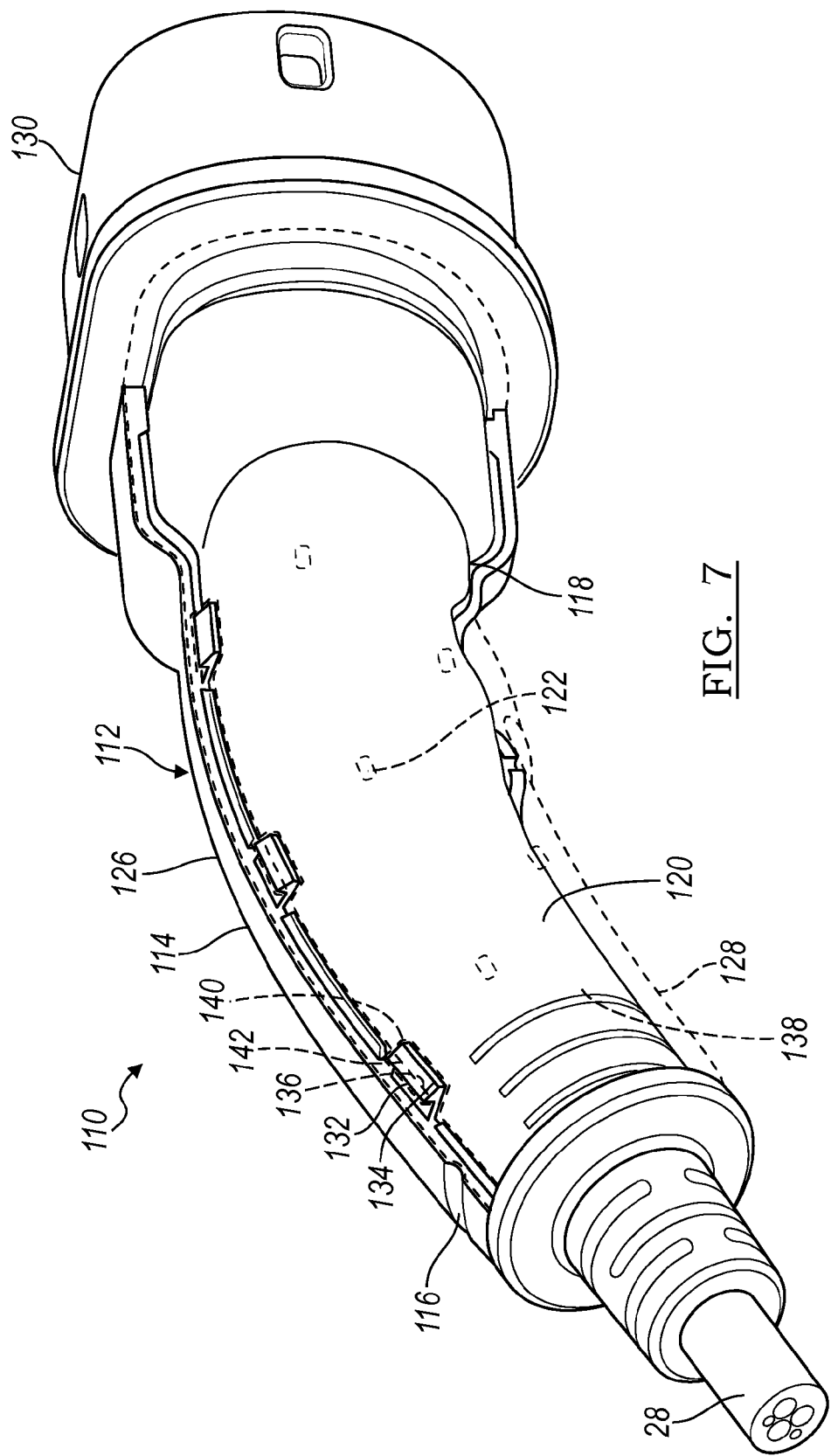
FIG. 7 is a side perspective view of the connector assembly of FIG. 1 according to yet another embodiment.

Referring now to FIG. 7, the housing 112 is illustrated having a first housing portion 126, a second housing portion 128, and a receptacle housing portion 130 as in prior embodiments. The first housing portion 126 includes a series of fastener mechanisms 132 that have a leading engagement surface 134 and an abutment surface 136. The fastener mechanisms 132 extend from a periphery of the first housing portion 126 and into a cavity 138 of the second housing portion 128. The second housing portion 128 also includes a series of fastener mechanisms 140 formed within the cavity 138 which provides a corresponding abutment surface 142. During assembly, the engagement surface 134 of the first fastener mechanism 132 engages the abutment surface 142 of the second fastener mechanism 140 thereby biasing the first fastener mechanisms 132 into the cavity 138. Once the abutment surface 136 of the first fastener mechanism 132 passes the abutment surface 142 of the second fastener mechanism 140, the abutment surfaces 136, 142 engage thereby fastening the first housing portion 126 to the second housing portion 128.

The housing 112 is enclosed by only one pair of handle housing portions 126, 128 thereby reducing parts in comparison to the prior art. The fastener mechanisms 132, 140 are concealed within the cavity 138 of the housing 112. The molded material provided within the cavity 138 provides a resistant force behind the first fastener mechanisms 132 thereby maintaining engagement of the fastener mechanisms 132, 140. Accordingly, disassembly of the connector assembly 110 is inhibited.

Various vehicles require various charging requirements. Thus, different vehicles are provided with different chargers. In order to prevent inadvertent connection with the wrong charger, vehicle charging receptacles 32 are often sized to receive a specific plug 38. Various charging requirements also require charging cables 28 of varying sizes, such as varying diameters. The connector assembly 20 provides a modular housing, such as the housing 112, which may receive charging cables 28 of varying diameters. Additionally, the housing 112 is configured to receive a separate receptacle housing portion such as the receptacle housing portion 130. Thus, the housing 112 can also receive other receptacle housing portions that are specific to a particular vehicle.

Figure 8:
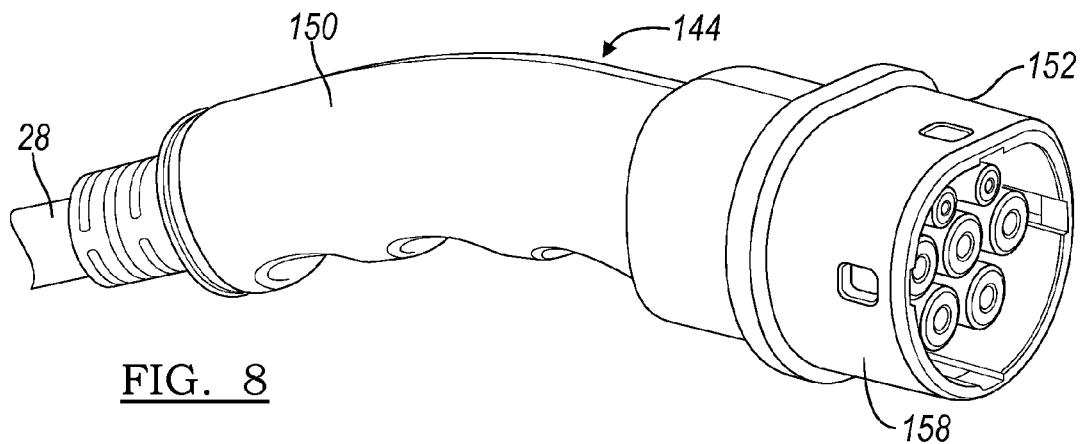
FIG. 8 is a perspective view of the connector assembly of FIG. 1 according to at least one embodiment.
Figure 9:
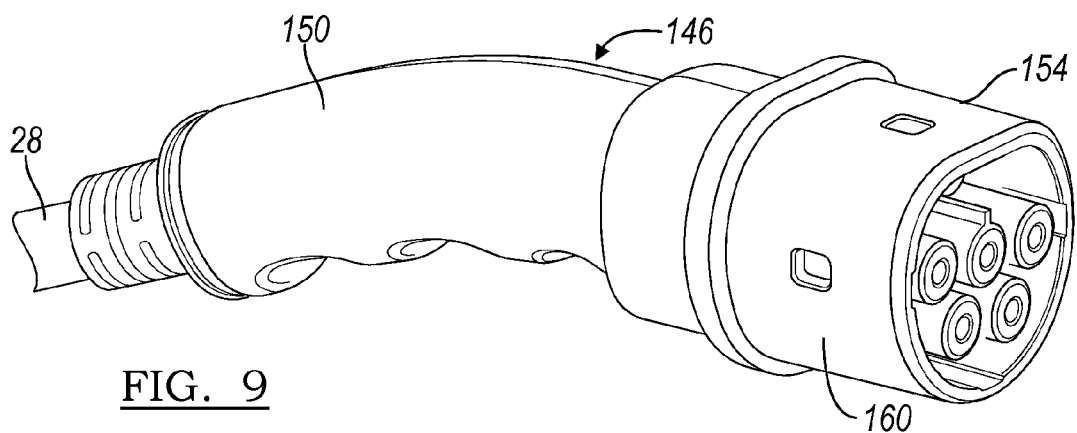
FIG. 9 is a perspective view of the connector assembly of FIG. 1 according to at least another embodiment.
Figure 10:
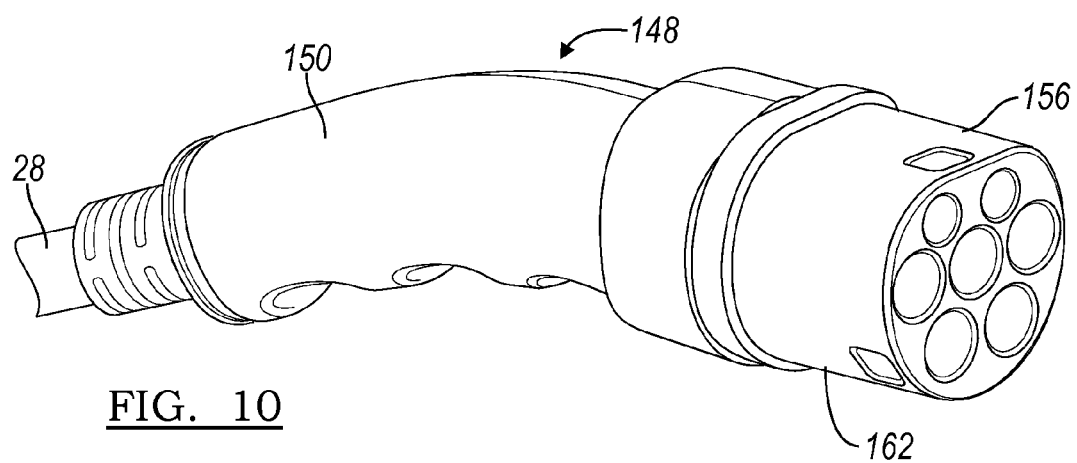
FIG. 10 is a perspective view of the connector assembly of FIG. 1 according to at least another embodiment.

This modularity is illustrated by the connector assemblies 144, 146, 148 in FIGS. 8-10. Each connector assembly 144, 146, 148 has a common housing 150. Each connector assembly 144, 146, 148 has a vehicle specific receptacle housing portion 152, 154, 156 assembled to the housing 150. Each receptacle housing portion 152, 154, 156 provides a plug 158, 160, 162 specific to a particular vehicle application. Thus, the, housing 150 may be employed for varying receptacle housing portions 152, 154, 156 as well as varying cable diameters. As vehicle charging application requirements vary, the common housing 150 may be employed for reducing costs and design, manufacturing, and materials.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A connector assembly comprising:
a housing forming an exterior, an inlet end, a cavity, and an outlet end, the housing having a recess formed within the exterior and at least one aperture formed through the housing within the recess for venting the cavity; and
a cord extending through the inlet end into the cavity;
wherein the housing forms a handle with a handle exterior; and
wherein the recess is formed in the handle exterior.

2. The connector assembly of claim 1 wherein the housing comprises:
a receptacle housing portion at the outlet end in electrical communication with the cord;
a first handle housing portion extending from the inlet end to the receptacle housing portion; and
a second handle housing portion extending from the inlet end to the receptacle housing portion, the second handle housing portion being sized to be assembled to the first handle housing portion to collectively retain the receptacle housing portion therebetween, and collectively provide the cavity;
wherein the first handle housing portion and the second handle housing portion collectively form the handle exterior.

3. The connector assembly of claim 2 wherein the first handle housing portion and the second handle housing portion collectively form the handle exterior;
wherein the first handle housing portion has a first fastener mechanism formed within the cavity; and
wherein the second handle housing portion has a second fastener mechanism sized to extend into a cavity of the first handle housing portion for engagement with the first fastener mechanism to fasten the first handle housing portion and the second handle housing portion together.

4. The connector assembly of claim 3 further comprising a molded material disposed within the cavity for engaging the fastened first and second fastener mechanisms for minimizing unfastening of the first and second fastener mechanisms.

5. The connector assembly of claim 2 wherein the housing further comprises:
   a first retainer oriented within a cavity of the first handle housing portion adjacent the inlet end;
   a second retainer oriented within the first handle housing portion cavity spaced apart from the first retainer and the inlet end;
   a third retainer oriented within a cavity of the second handle housing portion, opposing the first retainer and spaced apart from the first retainer a first distance for engaging a cord of a first thickness; and
   a fourth retainer oriented within the second handle housing portion cavity spaced apart from the third retainer, opposing the second retainer and spaced apart from the second retainer a second distance that is different than the first distance for engaging a cord of a second thickness.

6. The connector assembly of claim 2 further comprising a grommet oriented about the cord and retained within the first handle housing portion and the second handle housing portion.

7. The connector assembly of claim 2 further comprising:
   a plurality of conductive receptacles oriented within sockets in the receptacle housing portion, the receptacles being in electrical communication with the cord; and
   a backer plate fastened to the receptacle housing portion for retaining the receptacles within the sockets.

8. A connector assembly comprising:
   a first housing portion forming an exterior, an inlet end, a cavity, and an outlet end, the first housing portion having a first fastener mechanism formed within the cavity;
   a second housing portion sized to be assembled to the first housing portion, the second housing portion formed with an exterior, an inlet end, a cavity, and an outlet end, each corresponding to the first housing portion, the second housing portion comprising a second fastener mechanism sized to extend into the first housing portion cavity for engagement with the first fastener mechanism to fasten the first housing portion and the second housing portion together;
   a cord extending through the inlet ends of the first and second housing portions; and
   a molded material disposed within the cavity for engaging the fastened first and second fastener mechanisms for minimizing unfastening of the first and second fastener mechanisms.

9. The connector assembly of claim 8 wherein the first housing portion is further defined as a first handle housing portion and the second housing portion is further defined as a second handle housing portion, whereby the first and second handle housing portions collectively provide a handle.

10. The connector assembly of claim 9 further comprising a receptacle housing portion retained between the first and second handle housing portions at the outlet end, the receptacle housing portion being in electrical communication with the cord.

11. The connector assembly of claim 10 further comprising:
   a plurality of receptacles oriented within sockets in the receptacle housing portion, the receptacles being in electrical communication with the cord; and
   a backer plate fastened to the receptacle housing portion for retaining the receptacles within the sockets.

12. The connector assembly of claim 9 wherein the housing further comprises:
   a first retainer oriented within the first handle housing portion cavity adjacent the inlet end;
   a second retainer oriented within the first handle housing portion cavity spaced apart from the first retainer and the inlet end;
   a third retainer oriented within the second handle housing portion cavity, opposing the first retainer and spaced apart from the first retainer a first distance for engaging a cord of a first thickness; and
   a fourth retainer oriented within the second handle housing portion cavity spaced apart from the third retainer, opposing the second retainer and spaced apart from the second retainer a second distance that is different than the first distance for engaging a cord of a second thickness.

13. The connector assembly of claim 9 further comprising a grommet oriented about the cord and retained within the first handle housing portion and the second handle housing portion.

14. A connector housing assembly comprising:
   a first housing portion forming an inlet end and a cavity;
   a first retainer oriented within the first housing portion cavity adjacent to the inlet end;
   a second retainer oriented within the first housing portion cavity spaced apart from the inlet end and the first retainer;
   a second housing portion sized to be assembled to the first housing portion, the second housing portion formed with an inlet end and a cavity, each corresponding to the first housing portion;
   a third retainer oriented within the second housing portion cavity adjacent to the inlet end, opposing the first retainer and spaced apart from the first retainer a first distance for engaging a cord of a first thickness; and
   a fourth retainer oriented within the second housing portion cavity spaced apart from the inlet end and the third retainer, opposing the second retainer and spaced apart from the second retainer a second distance that is different than the first distance for engaging a cord of a second thickness.

15. The connector housing assembly of claim 14 further comprising:
   a fifth retainer oriented within the first housing portion cavity spaced apart from the first retainer and the second retainer; and
   a sixth retainer oriented within the second housing portion cavity spaced apart from the third retainer and the fourth retainer, opposing the fifth retainer and spaced apart from the fifth retainer a third distance that is different than the first and second distances for engaging a cord of a third thickness.

16. A connector assembly comprising:
   a connector housing assembly according to claim 14;
   a cord extending through the inlet end into the cavity; and
   a receptacle housing portion at an outlet end of the first and second housing portions in electrical communication with the cord.

17. The connector assembly of claim 16 further comprising a grommet oriented about the cord and retained with the first housing portion and the second housing portion.

18. The connector assembly of claim 16 further comprising:

a plurality of conductive receptacles oriented within sockets in the receptacle housing portion, the receptacles being in electrical communication with the cord; and a backer plate fastened to the receptacle housing portion for retaining the receptacles within the sockets.

19. The connector housing assembly of claim 14 wherein the first retainer and the third retainer are generally coaxial with the second retainer and the fourth retainer.

20. The connector housing assembly of claim 15 wherein the first retainer and the third retainer are generally coaxial with the second retainer and the fourth retainer; and wherein the first retainer and the third retainer are generally coaxial with the fifth retainer and the sixth retainer.

* * * * *